(12) United States Patent
Umetsu et al.

(10) Patent No.: US 6,229,723 B1
(45) Date of Patent: May 8, 2001

(54) POWER UNIT AND POWER SUPPLY SYSTEM WITH A COMPARISON CIRCUIT FOR A REVERSE FLOW PREVENTATIVE DIODE

(75) Inventors: Koji Umetsu; Masato Ishigaki, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/580,202

(22) Filed: May 26, 2000

(30) Foreign Application Priority Data

Jun. 1, 1999 (JP) .................................. 11-154405

(51) Int. Cl.[7] .......................... H02M 3/335; H02M 7/00; H02M 7/44
(52) U.S. Cl. ................................ 363/71; 363/97
(58) Field of Search .................. 363/21, 95, 97, 363/69, 71, 72

(56) References Cited

U.S. PATENT DOCUMENTS

| | | | |
|---|---|---|---|
| 4,447,866 | * 5/1984 | Reeves | 363/21 |
| 4,628,433 | * 12/1986 | Notohamiprodjo | 363/65 |
| 4,931,920 | * 6/1990 | Barker | 363/82 |
| 5,953,223 | * 9/1999 | Kato et al. | 363/69 |
| 6,014,322 | * 1/2000 | Higashi et al. | 363/65 |

* cited by examiner

*Primary Examiner*—Peter S. Wong
*Assistant Examiner*—Bao Q. Vu
(74) *Attorney, Agent, or Firm*—Ronald P. Kananen; Rader, Fishman & Grauer

(57) ABSTRACT

A power unit is provided that is not affected by a voltage fluctuation of a reverse flow-preventive diode provided in an output line thereof and that can provide a stable output controlled with a high accuracy. A first rectified diode 17 rectified and a first smoothing capacitor 18 smoothes the voltage switched by a transformer 14 to generate a DC voltage ($V_P$) at an A point. A reverse flow-preventive diode 21 and an output resistor 22 are provided between the A point and a positive output terminal 23. The comparison/detection circuit 25 compares the anode and cathode potentials of the reverse flow-preventive diode 21 with each other. The comparison/detection circuit 25 supplies a differential amplifier 26 the anode or cathode potential whichever is lower.

6 Claims, 12 Drawing Sheets

POWER UNIT AND POWER SUPPLY SYSTEM WITH A COMPARISON CIRCUIT FOR A REVERSE FLOW PREVENTATIVE DIODE

BACKGROUND OF THE INVENTION

1. Field of the Invention

The present invention relates to a power unit having a reverse flow-preventive diode provided in an output line thereof and to a power supply system having more than one such power unit connected in parallel to each other.

2. Description of the Related Art

There has been proposed a power supply system having a plurality of power units connected in parallel to each other. Since the power units are connected in parallel to each other, the power supply system can supply a load with a large power and, if any one of the power units fails, it can be backed up by the other normal one.

FIG. 1 shows a conventional power supply system having two flyback type switching converters connected in parallel to each other. The conventional power supply system is generally indicated with a reference 100.

As shown, the conventional power supply system 100 includes a first switching converter 101 and a second switching converter 102, connected in parallel to a load 103. The first and second switching converters 101 and 102 are identical in circuit configuration to each other. Therefore, the circuit configuration of only the first switching converter 101 will be explained hereinafter.

The first switching converter 101 includes an AC input terminal 111, an input filter 112 and a rectifying circuit 113.

The first switching converter 101 is applied with a commercial AC voltage, for example, via the AC input terminal 111. The AC voltage is then applied to the input filter 112. The input filter 112 is provided to remove power noise from the input AC voltage and, thus, the AC voltage with no power noise is applied to the rectifying circuit 113. The rectifying circuit 113 rectifies the AC voltage to provide a DC input voltage ($V_{in}$) of a predetermined value.

The first switching converter 101 further includes a transformer 114 having a primary winding 114a and a secondary winding 114b, a switching element 115, a pulse width modulating (PWM) circuit 116, a rectifier diode 117 and a smoothing capacitor 118.

The primary winding 114a of the transformer 114 has one end thereof connected to the rectifying circuit 113, which applies the DC input voltage ($V_{in}$) to that end of the primary winding 114a. The primary winding 114a of the transformer 114 has the other end thereof connected to the ground via the switching element 115. The switching element 115 is, for example, an FET. The switching element 115 has the gate thereof connected to the PWM circuit 116, and is driven in a pulsed manner by a PWM signal supplied from the PWM circuit 116. The switching element 115 is pulse-driven by the PWM signal to switch a current through the primary winding 114a of the transformer 114.

The secondary winding 114b of the transformer 114 has one end thereof connected to the ground. The secondary winding 114b of the transformer 114 has the other end thereof connected to the anode of the rectifier diode 117. The rectifier diode 117 has the cathode thereof connected to the ground via the smoothing capacitor 118. The connection point at which the cathode of the rectifier diode 117 and the smoothing capacitor 118 are connected to each other will be referred to as the D point. At the secondary winding 114b of the transformer 114, a voltage is induced from the primary winding 114a, due to the switching operation of the switching element 115. The rectifier diode 117 rectifies and the smoothing capacitor 118 smoothes the voltage induced at the secondary winding 114b to generate a DC voltage ($V_P$) at the D point.

The first switching converter 101 further includes a voltage divider 119, a voltage divider 120, a differential amplifier 121 to detect output voltage error, a reference voltage source 122 to generate a reference voltage ($V_{ref}$) and a photocoupler 123 consisting of a light emitting diode 124 and a phototransistor 125.

The voltage dividers 119 and 120 are connected in series between the D point and ground. The differential amplifier 121 has an inverting input terminal connected to a connection point between the voltage dividers 119 and 120 and a non-inverting input terminal connected to a positive terminal of the reference voltage source 122. The reference voltage source 122 has a negative terminal connected to the ground. The light emitting diode 124 of the photocoupler 123 has the anode and cathode thereof connected to the D point and the output terminal of the differential amplifier 121, respectively. The phototransistor 125 of the photocoupler 123 has the emitter and collector thereof connected to the ground and PWM circuit 116, respectively.

The differential amplifier 121 is supplied at the inverting input terminal thereof with a DC voltage ($V_P$) produced by dividing the DC voltage ($V_P$) at the D point at a ratio of voltage division between the voltage dividers 119 and 120. Also, the differential amplifier 121 is supplied at the non-inverting input terminal thereof with a reference voltage ($V_{ref}$) generated by the reference voltage source 122. The differential amplifier 121 amplifies a difference in voltage between the non-inverting and inverting input terminals thereof to provide a difference, namely, an error voltage, between the voltage-divided DC voltage ($V_P$) and the reference voltage ($V_{ref}$). The error voltage is applied to the PWM circuit 116 via the photocoupler 123. The PWM circuit 116 varies, based on the error voltage, the duty ratio of the PWM signal and switches the switching element 115 such that the DC voltage ($V_P$) at the D point is stabilized at a constant level.

The first switching converter 101 further includes a reverse flow-preventive diode 126, an output resistor 127, a positive output terminal 128 and a negative output terminal 129. The reverse flow-preventive diode 126 has the anode thereof connected to the D point and the cathode thereof connected to the positive output terminal 128 via the output resistor 127. The negative output terminal 129 is connected to the ground.

The conventional power supply system 100 has the first and second switching converters 101 and 102 connected in parallel to each other and supplies the load 103 with a power.

More specifically, the positive output terminal 128 of the first switching converter 101 and the positive output terminal 128 of the second switching converter 102 are connected to each other and to the positive power input terminal 104 of the load 103. Furthermore, the negative output terminal 129 of the first switching converter 101 and the negative output terminal 129 of the second switching converter 102 are connected to each other and to the negative power input terminal 105 of the load 103.

As in the above, the conventional power supply system 100 supplies the load 103 with a power which is larger than that generated by one switching converter.

Generally, in case a plurality of power units are connected in parallel to each other, there takes place a very small difference in output voltage between the power units.

Thus, in the conventional power supply system 100, the reverse flow-preventive diode 126 is provided to prevent a current from flowing from the switching converter which generates a high voltage to the switching converter which generates a low voltage, and the output resistor 127 is provided to absorb the potential difference, to minimize the difference between the currents supplied from the two switching converters 101 and 102, respectively, to the load 103 and to supply a power to the load 103 very efficiently.

It is assumed now that the voltage ($V_P$) generated at the D point of the first switching converter 101 has a value $V_{P1}$, voltage ($V_P$) generated at the D point of the second switching converter 102 has a value $V_{P2}$ and that $V_{P1} < V_{P2}$. It is also assumed that a DC current $I_1$ is delivered at the positive output terminal 128 of the first switching converter 101 and a DC current $I_2$ is delivered at the positive output terminal 128 of the second switching converter 102.

In this case, if the reverse flow-preventive diode 126 is not provided in the power supply system 100, a part (reverse flow $I_r$) of the DC current $I_2$ from the second switching converter 102 flows into the voltage dividers 119 and 120, thus generating no constant and stable DC voltage ($V_P$) at the D point. However, since the first switching converter 101 has the reverse flow-preventive diode 126, the reverse flow $I_r$ will not flow into the voltage dividers 119 and 120, thus a constant and stable DC voltage ($V_P$) is generated at the D point.

Further, if the output resistor 127 is not provided, the second switching converter 102 in which DC voltage ($V_P$) at the D point is high will provide 100% of a load current $I_0$, while the first switching converter 101 in which DC voltage ($V_P$) at the D point is low will provide no load current $I_o$. In the power supply system 100, however, as the DC currents $I_1$ and $I_2$ output from the positive output terminals 128 increase, respectively a voltage ($V_R$) generated across the output resistor 127 increases while an output voltage ($V_S$) generated at the positive output terminal 128 drops linearly. To avoid the above, both the first switching converter 101 and second switching converter 102 in the power supply system 100 will evenly contribute themselves to supply the load current $I_o$.

FIG. 2 shows a relationship between the output currents $I_1$, $I_2$ from the first switching converters 101 and 102, and the output voltage ($V_S$) supplied from the power supply system 100 to the load 103.

As shown in FIG. 2, even if there is generated a very small difference between the voltage $V_{P1}$ at the D point of the first switching converter 101 and the voltage $V_{P2}$ at the D point of the second switching converter 102, the output resistor 127 provides a linear voltage drop ($V_R$), since the output resistor 127 is provided between the D point and the positive output terminal 128. Thus, also when the output voltage ($V_S$) applied from the positive output terminal 128 to the load 103 is constant, a current for supply to the load 103 is supplied from each of the first switching converter 101 and second switching converter 102. When the output voltage ($V_S$) is 8V, for example, the first switching converter 128 will provide an output current of 4A from the positive output terminal 128 thereof, while the second switching converter 102 will provide an output current of 6A from the positive output terminal 128 thereof.

As in the above, there is provided a reverse flow-preventive diode 126 in both of the first and second switching converters 101 and 102. Like the output resistor 127, the reverse flow-preventive diode 126 has such a nature that when the current through the reverse flow-preventive diode 126 has a larger value than predetermined, a drop voltage ($V_F$) increases in proportion to the flowing current. Thus, when the output current value is larger than predetermined, the reverse flow-preventive diode 126 can drop the output voltage ($V_S$) at the positive output terminal 128 linearly and similarly to the output resistor 127.

The drop $V_{dp}$ of the output voltage ($V_S$) provided from the positive output terminal 128 of each of the first and second switching converters 101 and 102 will be as follows, in case the reverse flow-preventive diode 126 is provided in each switching converter:

$$V_{dp} = V_F + V_R$$

When the current through the reverse flow-preventive diode 126 has a smaller value than a predetermined one, the drop voltage ($V_F$) will vary largely without increasing in proportion to the flowing. A Schottky diode, for example, has a volt-ampere characteristic as shown in FIG. 3. When the current through the Schottky diode is smaller than 2A, the voltage varies significantly larger than the current as shown in FIG. 3.

Thus, with the switching converter using the reverse flow-preventive diode 126, if the output current value is smaller than a predetermined one, the output voltage varies largely, even when the current variation is small.

Thus, in the power supply system 100, when the output current value is smaller than a predetermined one, the reverse flow-preventive diode 126 will cause a large difference between the DC current $I_1$ from the first switching converter 101 and DC current $I_2$ from the second switching converter 102, and thus one of the switching converters 101 and 102 will contribute more to providing the load current $I_o$ than the other. This one-sided contribution to providing the load current $I_o$ will adversely affect the product reliability.

Generally, there is raised a voltage fluctuation in a diode when the temperature changes. Thus, even if the value of the current through the reverse flow-preventive diode 126 is larger than a predetermined value and the drop voltage ($V_F$) caused by the reverse flow-preventive diode 126 increases in proportion to the flowing current, there will take place a large difference between the DC current $I_1$ from the first switching converter 101 and the DC current $I_2$ from the second switching converter 102.

OBJECT AND SUMMARY OF THE INVENTION

It is, therefore, an object of the present invention to overcome the above-mentioned drawbacks by providing a power unit that is not affected by a voltage fluctuation of a reverse flow-preventive diode provided in an output line thereof and that provides a stable output voltage controlled with a high accuracy and a power supply system having a plurality of such power units connected in parallel to each other.

According to the present invention, there is provided a power unit including:
  a DC voltage source;
  an output terminal connected to an external load to supply a power to the latter;
  a diode provided between the DC voltage source and output terminal, whose anode is connected to the DC voltage source and cathode is connected to the output terminal;
  means for controlling a DC voltage generated by the DC voltage source based on an output voltage control signal; and means for comparing the anode and cathode potentials of the diode with each other and supplying the controlling means with the anode potential of the diode as the output voltage control signal when the anode potential is lower, while supplying the controlling means with the cathode potential of the diode as the output voltage control signal when the cathode potential is lower.

The above power unit has provided between the DC voltage source and output terminal the diode whose anode is connected to the DC voltage source. The diode prevents a current from reversely flowing from outside via the output terminal. In the power unit, the comparing means compares the anode and cathode potentials of the diode with each other and supplies the controlling means with the anode or cathode potential, whichever is lower, as the output voltage control signal, and the controlling means controls the output voltage of the DC voltage source based on the supplied output voltage control signal. That is, in the power unit, when a forward current flows through the diode, the cathode potential is detected and the DC voltage from the DC voltage source is controlled based on the detected cathode potential. And, in the power unit, when no forward current flows through the diode, the anode potential is detected and the DC voltage from the DC voltage source is controlled based on the detected anode potential.

Thus, in case this power unit is connected in parallel to any other power unit to supply power to a load, or in case the power unit is used to supply a power to a secondary battery, it is possible to prevent a current from reversely flowing from outside and control the output voltage under no influence of the voltage drop by the diode. Therefore, the power unit can supply the load with a stable output voltage controlled with a high accuracy.

When the anode potential of the diode is equal to the cathode potential, either of the potentials may be detected.

According to the present invention, there also is provided a power supply system having a plurality of power units connected in parallel to an external load, each of the power units includes:

a DC voltage source;

an output terminal connected to the external load to supply a power to the latter;

a diode provided between the DC voltage source and output terminal, whose anode is connected to the DC voltage source and cathode is connected to the output terminal;

an output resistor provided between the diode and output terminal;

means for controlling a DC voltage generated by the DC voltage source based on an output voltage control signal;

means for comparing the anode and cathode potentials of the diode with each other, and supplying the controlling means with the anode potential of the diode as the output voltage control signal when the anode potential is lower, while supplying the controlling means with the cathode potential of the diode as the output voltage control signal when the cathode potential is lower; and the output resistors of the power units having the same resistance.

Each of the power units has the diode and output resistor provided between the DC voltage source and output terminal, the diode having an anode connected to the DC voltage source. The diode prevents a current from reversely flowing from outside via the output terminal. The output resistor drops the voltage output from the output terminal in proportion to the current output from each of the power units.

In each of the power units, the comparing means compares the anode and cathode potentials of the diode with each other and supplies the controlling means with the anode or cathode potential, whichever is lower, as the output voltage control signal. The controlling means controls the output voltage of the DC voltage source based on the supplied output voltage control signal. That is, in the power unit, when a forward current flows through the diode, the cathode potential is detected and the DC voltage from the DC voltage source is controlled based on the detected cathode potential. And, in the power unit, when no forward current flows through the diode, the anode potential is detected and the DC voltage from the DC voltage source is controlled based on the detected anode potential.

When the anode potential of the diode is equal to the cathode potential, either of the potentials may be detected.

The power supply system, according to the present invention, can prevent a current from reversely flowing from outside each of power units, that is, from other power units, and control the output voltage from the DC voltage source under no influence of the voltage drop by the diode, thereby providing to the load a stable output voltage controlled with a high accuracy. Furthermore, the power supply system can minimize the difference between the output currents from the incorporated power units since the output voltage can be controlled under no influence of the voltage drop by the reverse flow-preventive diode, thereby improving the product reliability very much.

These objects, other objects, features and advantages of the present intention will become more apparent from the following detailed description of the preferred embodiments of the present invention, when taken in conjunction with the accompanying drawings.

DETAILED DESCRIPTION OF THE PREFERRED EMBODIMENTS

Figure 1:
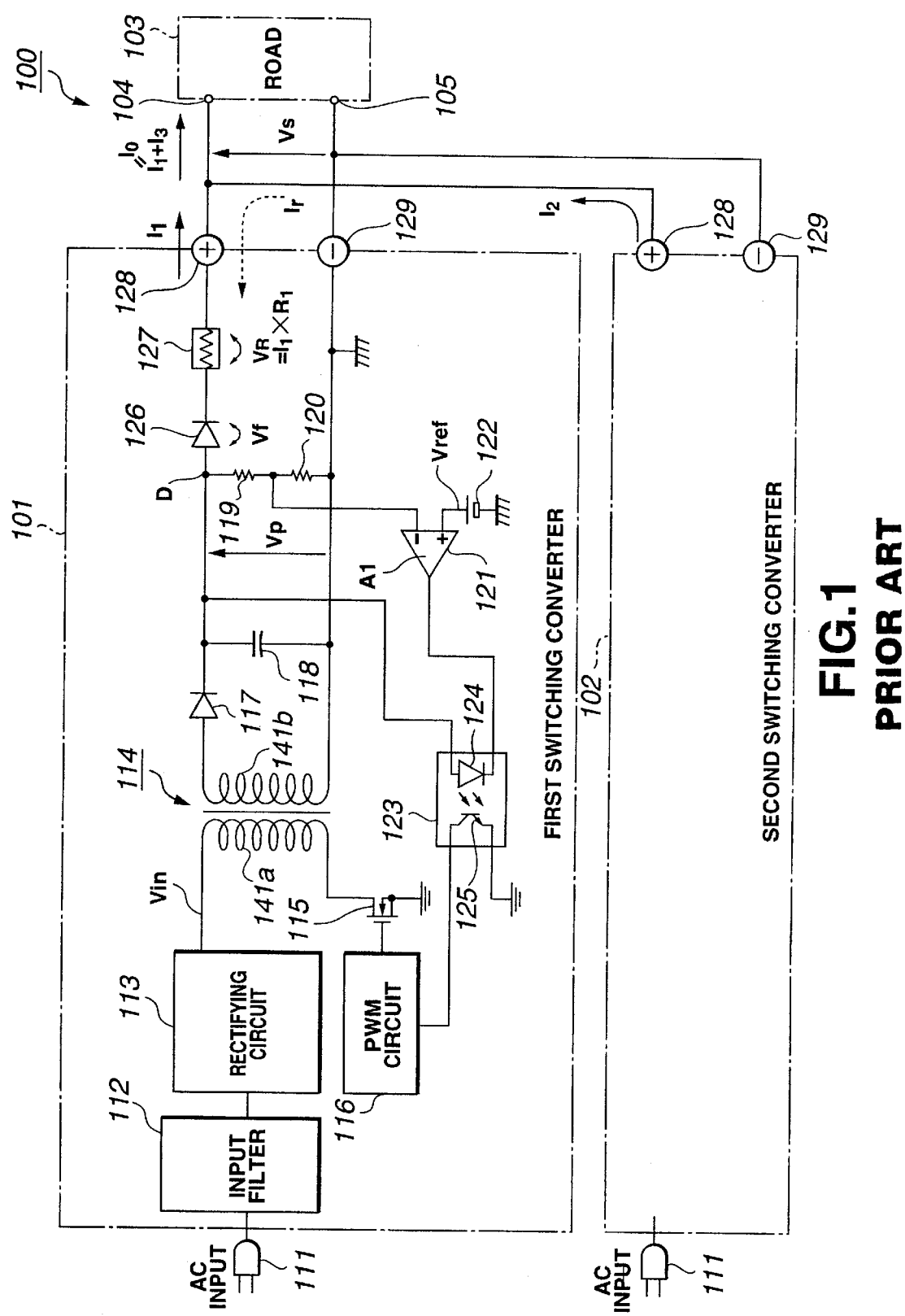
FIG. 1 shows a circuit diagram of a conventional power supply system.
Figure 2:
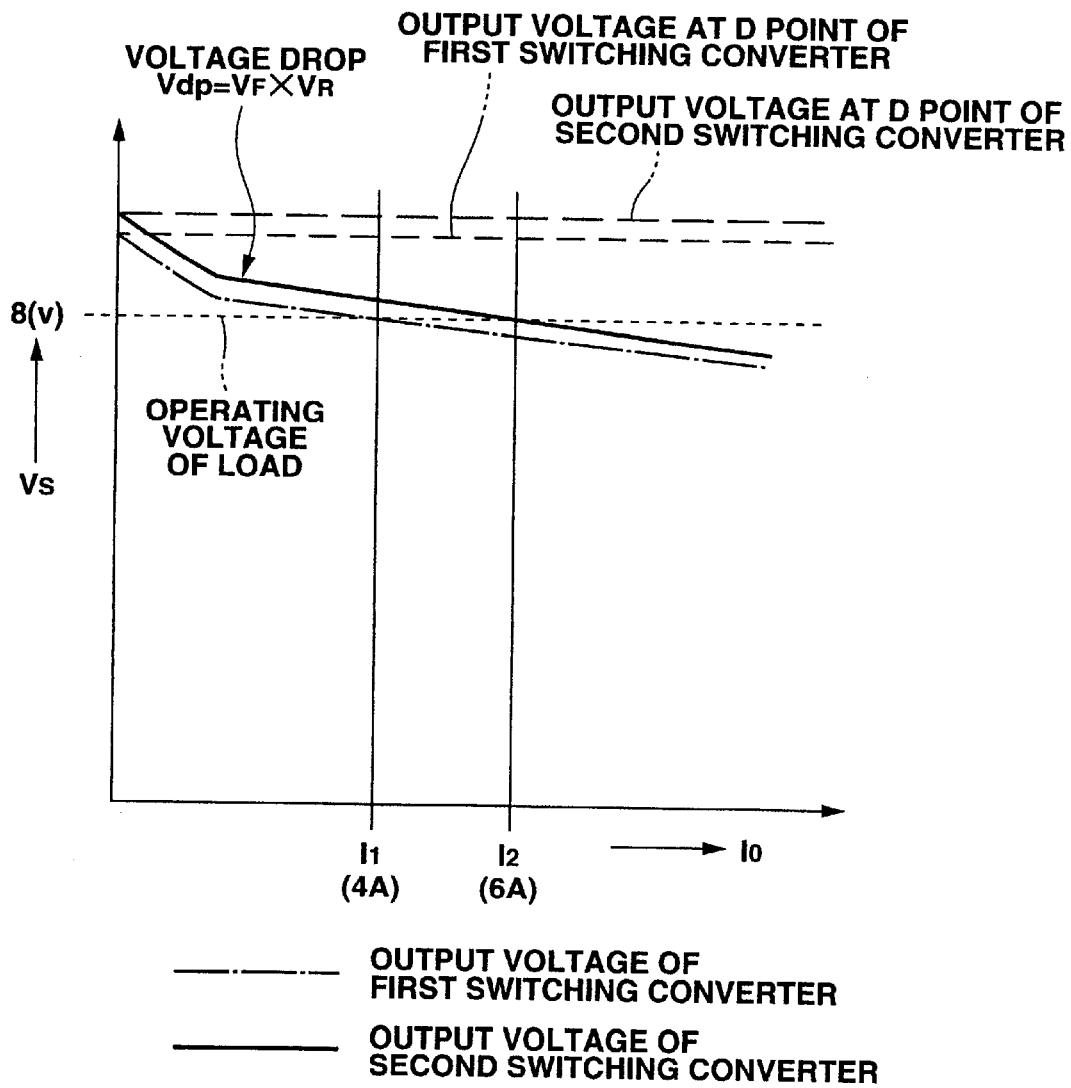
FIG. 2 shows an output characteristic of the conventional power supply system.
Figure 3:
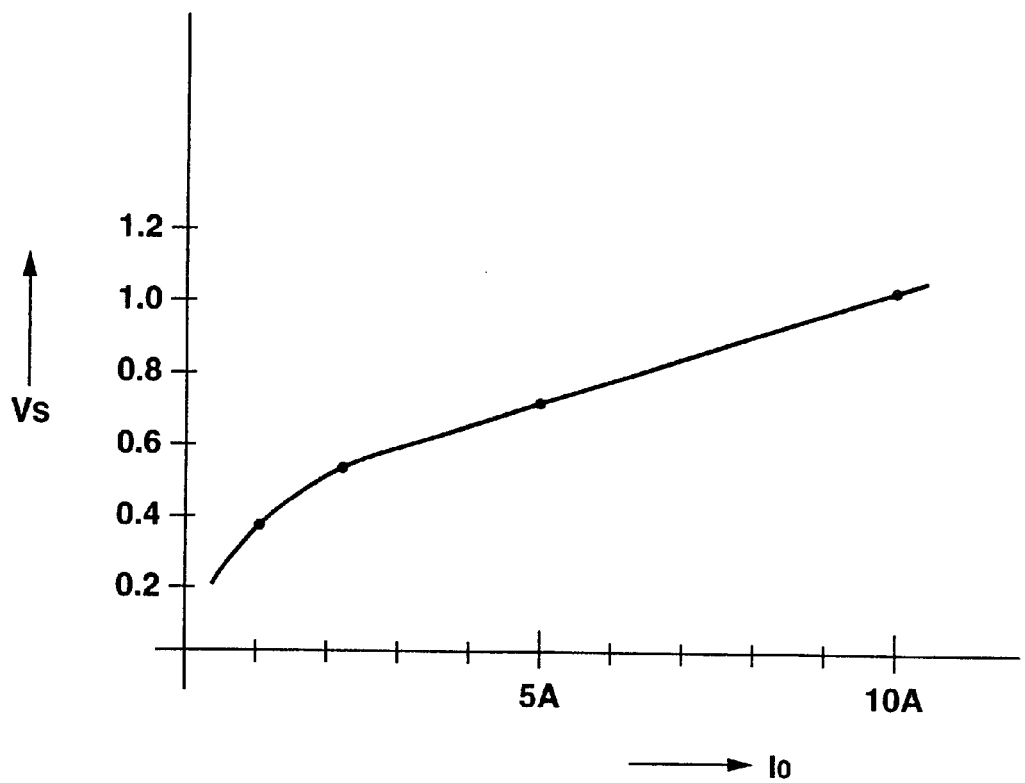
FIG. 3 shows a volt-ampere characteristic of a Schottky diode.
Figure 4:
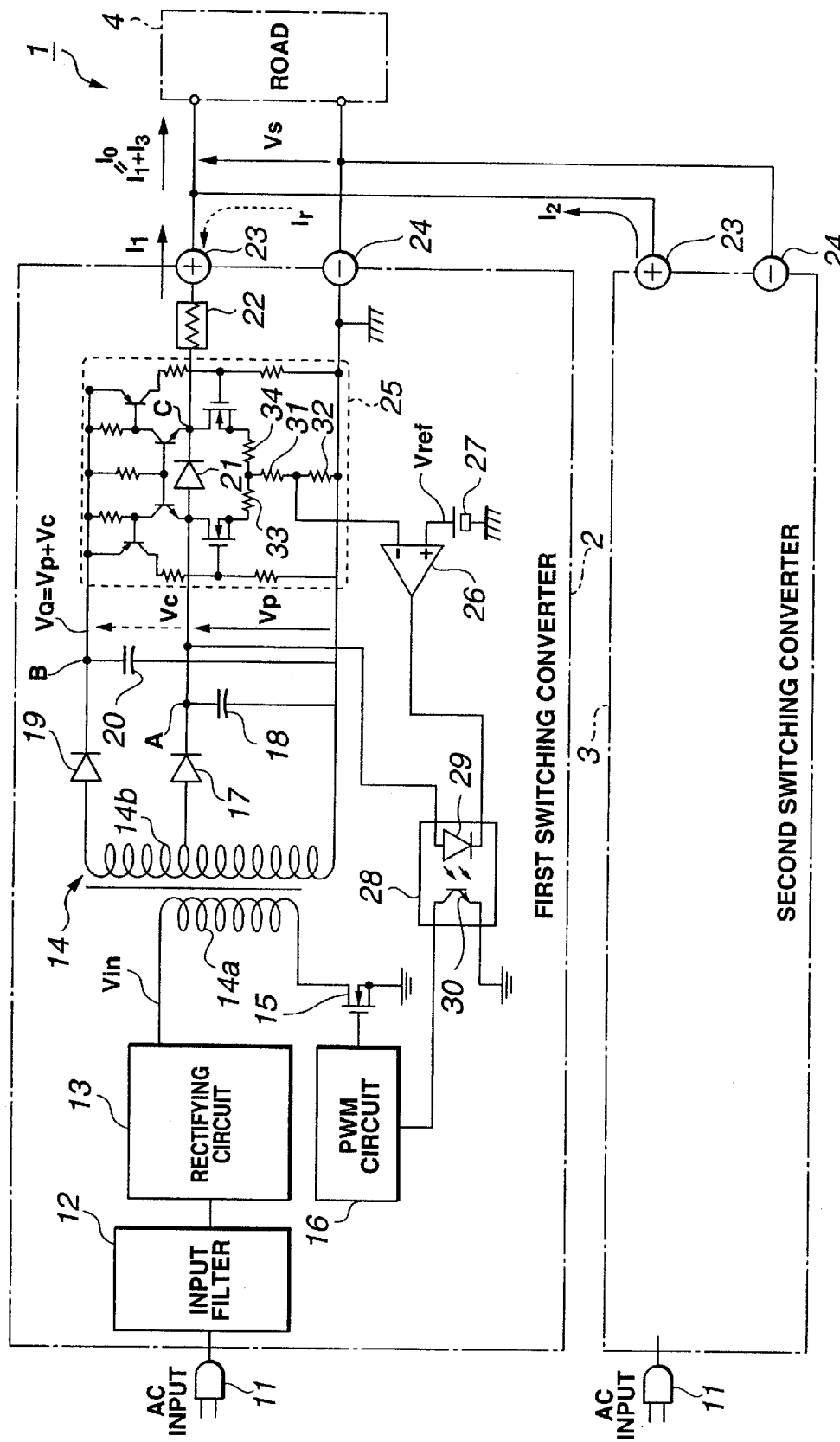
FIG. 4 shows a circuit diagram of the first embodiment of the power supply system employing the present invention.

Referring now to FIG. 4, there is illustrated the first embodiment of the power supply system according to the present invention. The power supply system is generally indicated with a reference 1. As shown, it is composed of two flyback type switching converters connected in parallel to each other.

As shown, the power supply system 1 includes a first switching converter 2 and a second switching converter 3, connected in parallel to a load 4. The first and second switching converters 2 and 3 are identical in circuit configuration to each other. Therefore, the circuit configuration of only the first switching converter 2 will be explained hereinafter.

The first switching converter 2 includes an AC input terminal 11, an input filter 12 and a rectifying circuit 13.

The first switching converter 2 is applied with a commercial AC voltage, for example, via the AC input terminal 11. The AC voltage is then applied to the input filter 12. The input filter 12 is provided to remove a power noise from the input AC voltage and, thus, the AC voltage with no power noise is applied to the rectifying circuit 13. The rectifying circuit 13 rectifies the AC voltage to provide a DC input voltage ($V_{in}$) of a predetermined value.

The first switching converter 2 further includes a transformer 14 having a primary winding 14a and a secondary winding 14b, a switching element 15, a pulse width modulating (PWM) circuit 16, a first rectifier diode 17, a first smoothing capacitor 18, a second rectifier diode 19 and a second smoothing capacitor 20.

The primary winding 14a of the transformer 14 has one end thereof connected to the rectifying circuit 13 which applies the DC input voltage ($V_{in}$) to that end of the primary winding 14a. The primary winding 14a of the transformer 14 has the other end thereof connected to the ground via the switching element 15. The switching element 15 is, for example, an FET. The switching element 15 has the gate thereof connected to the PWM circuit 16, and is driven in a pulsed manner by a PWM signal supplied from the PWM circuit 16. The switching element 15 is pulse-driven by the PWM signal to switch a current through the primary winding 14a of the transformer 14.

The secondary winding 14b of the transformer 14 has one end thereof connected to the ground. The first rectifier diode 17 has an anode connected between the one end of the secondary winding 14b of the transformer 14, connected to the ground, and the other end not connected to the ground. The cathode of the first rectifying diode 17 is connected to the ground via the first smoothing capacitor 18. The connection point at which the cathode of the first rectifier diode 17 and the first smoothing capacitor 18 are connected to each other will be referred to as the A point. The other end, that is not connected to the ground, of the secondary winding 14b of the transformer 14 is connected to an anode of the second rectifier diode 19. The second rectifier diode 19 has a cathode connected to the ground via the second smoothing capacitor 20. The connection point at which the cathode of the second rectifier diode 19 and the second smoothing capacitor 20 are connected to each other will be referred to as the B point.

At the secondary winding 14b of the transformer 14, a voltage is induced from the primary winding 14a due to the switching operation of the switching element 15. The first rectifier diode 17 rectifies and the first smoothing capacitor 18 smoothes the voltage induced at the secondary winding 14b to generate a DC voltage ($V_P$) at the A point. Similarly, the second rectifier diode 19 rectifies and the second smoothing capacitor 20 smoothes the voltage induced at the secondary winding 14b to generate a DC voltage ($V_Q$) at the B point.

The DC voltage ($V_Q$) at the B point is higher than the DC voltage ($V_P$) at the A point. For example, the DC voltage ($V_P$) at the A point is 8 V and the DC voltage ($V_Q$) at the B point is 16 V. The DC voltage ($V_P$) at the A point is used for supplying the load 4 with power. The DC voltage ($V_Q$) at the B point is used for carrying out the stable drive of a transistor or an FET of a comparator/detector circuit 25 which will be described hereinafter. It is assumed that the difference between the DC voltage ($V_Q$) at the B point and the DC voltage ($V_P$) at the A point is a potential difference ($V_C$).

The first switching converter 2 further includes a reverse flow-preventive diode 21, an output resistor 22, a positive output terminal 23 and a negative output terminal 24. The reverse flow-preventive diode 21 has the anode thereof connected to the A point and the cathode thereof connected to the positive output terminal 23 via the output resistor 22. The negative output terminal 24 is connected to the ground. The connection point at which the cathode of the reverse flow-preventive diode 21 and the output resistor 22 are connected to each other will be referred to as the C point.

The reverse flow-preventive diode 21 prevents a current from reversely flowing from outside via the positive output terminal 23.

The output resistor 22 is provided to absorb the potential difference between the first switching converter 2 and second switching converter 3 to minimize the difference between the currents supplied from the two switching converters, respectively, to the load 4. That is, since the output resistor 22 is provided, as the current increases, the output voltage drops linearly. The output resistor 22 of the first switching converter 2 and the output resistor 22 of the second switching converter 3 have the same resistance.

The first switching converter 2 further includes a comparison/detection circuit 25, a differential amplifier 26 to detect output voltage error, a reference voltage source 27 to generate a reference voltage ($V_{ref}$) and a photocoupler 28 consisting of a light emitting diode 29 and a phototransistor 30.

The comparison/detection circuit 25 includes a voltage divider 31 and a voltage divider 32 connected in series to each other. The series-connected voltage dividers 31 and 32 have one end thereof connected to the ground. The other end of the series-connected voltage dividers 31 and 32 is switched for connection to the A point or the C point via a resistor 33 or a resistor 34, respectively. That is, the other end of the series-connected voltage dividers 31 and 32, that is not connected to the ground, is switched for connection to the anode or cathode of the reverse flow-preventive diode 21.

The comparison/detection circuit 25 compares the anode potential (the potential at the A point) of the reverse flow-preventive diode 21 with the cathode potential (the potential at the C point) of the reverse flow-preventive diode 21. The comparison/detection circuit 25 connects the anode of the reverse flow-preventive diode 21 to the series-connected voltage dividers 31 and 32 when the anode potential is lower. The comparison/detection circuit 25 connects the cathode of the reverse flow-preventive diode 21 to the series-connected voltage dividers 31 and 32 when the cathode potential is lower. Thus, the comparison/detection circuit 25 compares the anode and cathode potentials of the reverse flow-preventive diode 21 with each other and applies the anode or cathode potential, whichever is lower, to the series-connected voltage dividers 31 and 32.

The connection point between the voltage dividers 31 and 32 is connected to the inverting input terminal of the differential amplifier 26. The reference voltage source 27 has negative and positive terminals connected to the ground and the non-inverting input terminal of the differential amplifier 26, respectively. The light emitting diode 29 of the photocoupler 28 has the anode and cathode thereof connected to the A point and the output terminal of the differential amplifier 26, respectively. The phototransistor 30 of the photocoupler 28 has the emitter and collector thereof connected to the ground and PWM circuit 16, respectively In this way, the differential amplifier 26 is supplied at the inverting input terminal thereof with a DC voltage produced by dividing the DC voltage at the A point or, C point at a ratio of voltage division between the voltage dividers 33 and 34, voltage divider 31 and voltage divider 32. Also, the differential amplifier 26 is supplied at the non-inverting input terminal thereof with a reference voltage ($V_{ref}$) generated by the reference voltage source 27. The differential amplifier 26 amplifies a difference in voltage between the non-inverting and inverting input terminals thereof to provide a difference, namely, an error voltage, between the voltage-divided DC voltage ($V_P$) and reference voltage ($V_{ref}$). The error voltage is applied to the PWM circuit 16 via the photocoupler 28. The PWM circuit 16 varies the duty ratio of the PWM signal to decrease the on-period when the error voltage is negative, increase the on-period when the error voltage is positive, and switch the switching element 15 such that the DC voltage generated at the A point or, C point is stabilized at a constant level.

The first switching converter 2 constructed as in the above can provide a stable DC output voltage ($V_S$) between the positive and negative output terminals 23 and 24.

In the power supply system 1, according to the first preferred embodiment of the present invention, the first and second switching converters 2 and 3 are connected in parallel to the load 4, and supply the load 4 with a power.

More specifically, the positive output terminal 23 of the first switching converter 2 and the positive output terminal 23 of the second switching converter 3 are connected to each other and to the positive power input terminal of the load 4. Furthermore, the negative output terminal 24 of the first switching converter 2 and the negative output terminal 24 of the second switching converter 3 are connected to each other and to the negative power input terminal of the load 4.

As in the above, the first embodiment of the power supply system 1 supplies the load 4 with power, which is larger than that generated by one switching converter. Furthermore, if any one of the switching converters fails, the power supply system 1 can be backed up by the other normal one.

As in the above, each of the first and second switching converters 2 and 3 of the power supply system 1 includes a reverse flow-preventive diode 21 and an output resistor 22. Thus, in the power supply system 1, the reverse flow-preventive diode 21 is provided to prevent a current from flowing from the switching converter which generates a high voltage to the switching converter which generates a low voltage and the output resistor 22 is provided to absorb the potential difference, to minimize the difference between the currents supplied from the two switching converters 2 and 3, respectively, to the load 4 and to supply power to the load 4 very efficiently.

Figure 5:
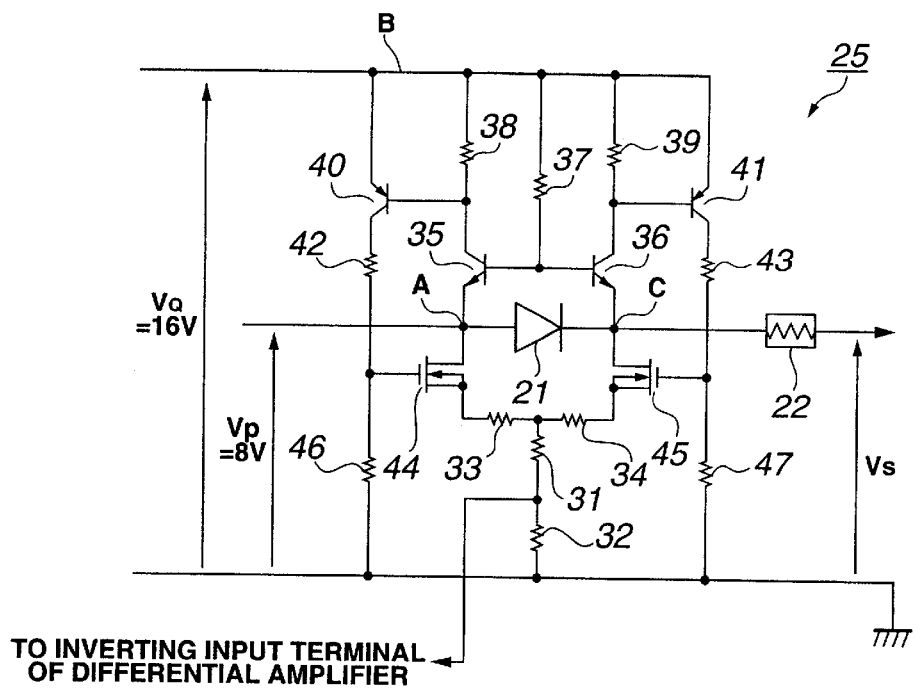
FIG. 5 shows a circuit diagram of a comparator/detector unit of the first embodiment of the power supply system.

FIG. 5 shows the circuit configuration of the comparison/detection circuit 25 of each of the first and second switching converters 2 and 3. The comparison/detection circuit 25 will be explained further below.

The voltage dividers 31 and 32 are connected in series to each other. The series-connected voltage dividers 31 and 32 have one end thereof connected to the ground. Specifically, the voltage divider 32 has one end connected to the ground and the other end connected to the voltage divider 31. The connection point between the voltage divider 31 and voltage divider 32 is connected to the inverting input terminal of the differential amplifier 26.

The reverse flow-preventive diode 21 has an anode (A point) connected to an emitter of a first npn transistor 35. The reverse flow-preventive diode 21 has a cathode (C point) connected to an emitter of a second npn transistor 36. The first and second npn transistors 35 and 36 have the bases thereof connected to each other and to the B point via a resistor 37.

The first npn transistor 35 has a collector connected to the B point via a resistor 38 and also to the base of a first pnp transistor 40. The second npn transistor 36 has a collector connected to the B point via a resistor 39 and also to the base of a second pnp transistor 41.

The first pnp transistor 40 has the emitter thereof connected to the B point. The second pnp transistor 41 has the emitter thereof connected to the B point. The first pnp transistor 40 has the collector thereof connected to the gate of a first FET 44 via a resistor 42. The second pnp transistor 41 has the collector thereof connected to the gate of a second FET 45 via a resistor 43.

The first FET 44 has a gate connected to the ground via a resistor 46. The second FET 45 has a gate connected to the ground via a resistor 47. The first FET 44 has a source connected to the one end of the series-connected voltage dividers 31 and 32 not connected to the ground via the resistor 33. The second FET 45 has the source thereof connected to the one end of the series-connected voltage dividers 31 and 32 not connected to the ground via the resistor 34.

The first FET 44 has a drain connected to the anode (A point) of the reverse flow-preventive diode 21. The second FET 45 has a drain connected to the cathode (C point) of the reverse flow-preventive diode 21.

Each active element of the comparison/detection circuit 25 becomes operable when a DC voltage applied to the B point is higher than a DC voltage applied to the A point. For example, each active element of the comparison/detection circuit 25 is operable when a voltage of 8 V is applied to the A point and a voltage of 16 V is applied to the B point.

The comparison/detection circuit 25 functions as will be explained hereinafter.

Whichever of the first or second npn transistor 35 or 36 whose emitter potential is lower is on, since the first and second npn transistors 35 and 36 have the bases thereof connected to a common point, and they are biased via a resistor 37.

It is assumed now that the potential at the C point is lower than that at the A point ($V_P > V_S$). In this case, the first npn transistor 35 is off and the second npn transistor 36 is on. When the first npn transistor 35 is off, the first pnp transistor 40 is also off. When the second npn transistor 36 is on, the second pnp transistor 41 is also on. When the first pnp transistor 40 is off, the first FET 44 is off. When the second pnp transistor 41 is on, the second FET 45 is on. Thus, the C point is connected to the series-connected voltage dividers 31 and 32 via the resistor 34.

It is assumed that the potential at the A point is lower than that at the C point ($V_S > V_P$). In this case, the first npn transistor 35 is on and the second npn transistor 36 is off. When the first npn transistor 35 is on, the first pnp transistor 40 is also on. When the second npn transistor 36 is off, the second pnp transistor 41 is also off. When the first pnp transistor 40 is on, the first FET 44 is on. When the second pnp transistor 41 is off, the second FET 45 is off. Thus, the A point is connected to the series-connected voltage dividers 31 and 32 via the resistor 33.

As in the above, when the potential at the C point is lower than that at the A point, that is, when the cathode potential of the reverse flow-preventive diode 21 is lower than the anode potential of the reverse flow-preventive diode 21 and a forward current flows through the reverse flow-preventive diode 21, the comparison/detection circuit 25 applies the cathode potential of the reverse flow-preventive diode 21 to the series-connected voltage dividers 31 and 32. Thus, the cathode potential of the reverse flow-preventive diode 21 is fed back to the PWM circuit 16, so that the cathode potential of the reverse flow-preventive diode 21 will be constant and stable.

And, when the potential at the A point is lower than that at the C point, that is, when the anode potential of the reverse flow-preventive diode 21 is lower than the cathode potential of the reverse flow-preventive diode 21 and a forward current does not flow through the reverse flow-preventive diode 21, the comparison/detection circuit 25 applies the anode potential of the reverse flow-preventive diode 21 to the series-connected voltage dividers 31 and 32. Thus, the anode potential of the reverse flow-preventive diode 21 is fed back to the PWM circuit 16, so that the anode potential of the reverse flow-preventive diode 21 will be constant and stable.

The first and second switching converters 2 and 3, each including the above described comparison/detection circuit 25, has their positions switched over by the comparison/detection circuit 25 to those for a stable voltage output. Thus, in each of the first and second switching converters 2 and 3, the influence of the voltage drop by the reverse flow-preventive diode 21 on their volt-ampere output characteristic is eliminated and, thus, the volt-ampere output characteristic depends on only the voltage drop by the output resistor 22.

Figure 6:
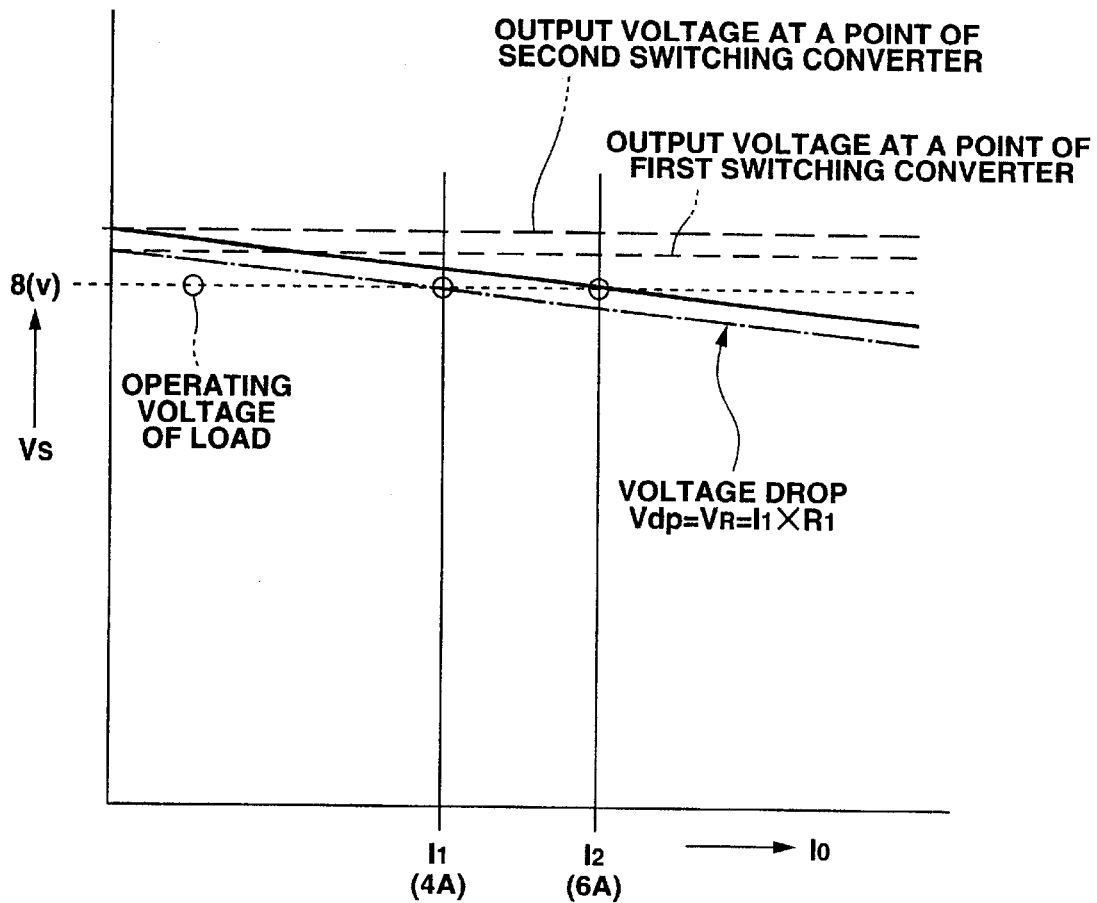
FIG. 6 shows an output characteristic of the first embodiment of the power supply system.

FIG. 6 shows the volt-ampere output characteristics of the first and second switching converters 2 and 3.

As shown in FIG. 6, an output voltage drop ($V_F$) from the reverse flow-preventive diodes 21 is not included in the drops of output voltages ($V_S$) of the first and second switching converters 2 and 3, but the voltage drops are always proportional to the output currents. Thus, each of the first and second switching converters 2 and 3 can drop the output voltage ($V_S$) linearly even if the current is small.

In this way, each of the first and second switching converters 2 and 3 always drops the output voltage ($V_S$) linearly regardless of the magnitude of the output current value. Thus, there will be no difference between the DC currents from the first and second switching converters 2 and 3, respectively, and the first and second switching converters 2 and 3 will evenly contribute themselves by providing a stable load current $I_o$. Also, the drop of the output voltage ($V_S$) will be stable, not affected by a temperature drift of the reverse flow-preventive diode 21.

A drop ($V_{dp}$) of an output voltage ($V_S$) from the positive output terminal 23 of the first switching converter 2 will be expressed as follows. A drop ($V_{dp}$) of an output voltage ($V_S$) from the positive output terminal 23 of the second switching converter 3 will be given by the same expression.

$$V_{dp} = V_R$$
$$= I_1 \times R_1$$

where $I_1$ is an output current of the first switching converter 2, and $R_1$ is a resistance of the output resistor 22 of the first switching converter 2.

When the potential at the A point is equal to that at the C point, or when the difference between the voltage at the A point and that at the C point is extremely small (for example, approximately ±0.1 V), the first and second npn transistors 35 and 36 of the comparison/detection circuit 25 are turned on at the same time. Thus, in this case, the first FET 44 and second FET 45 are turned on at the same time.

Figure 7:
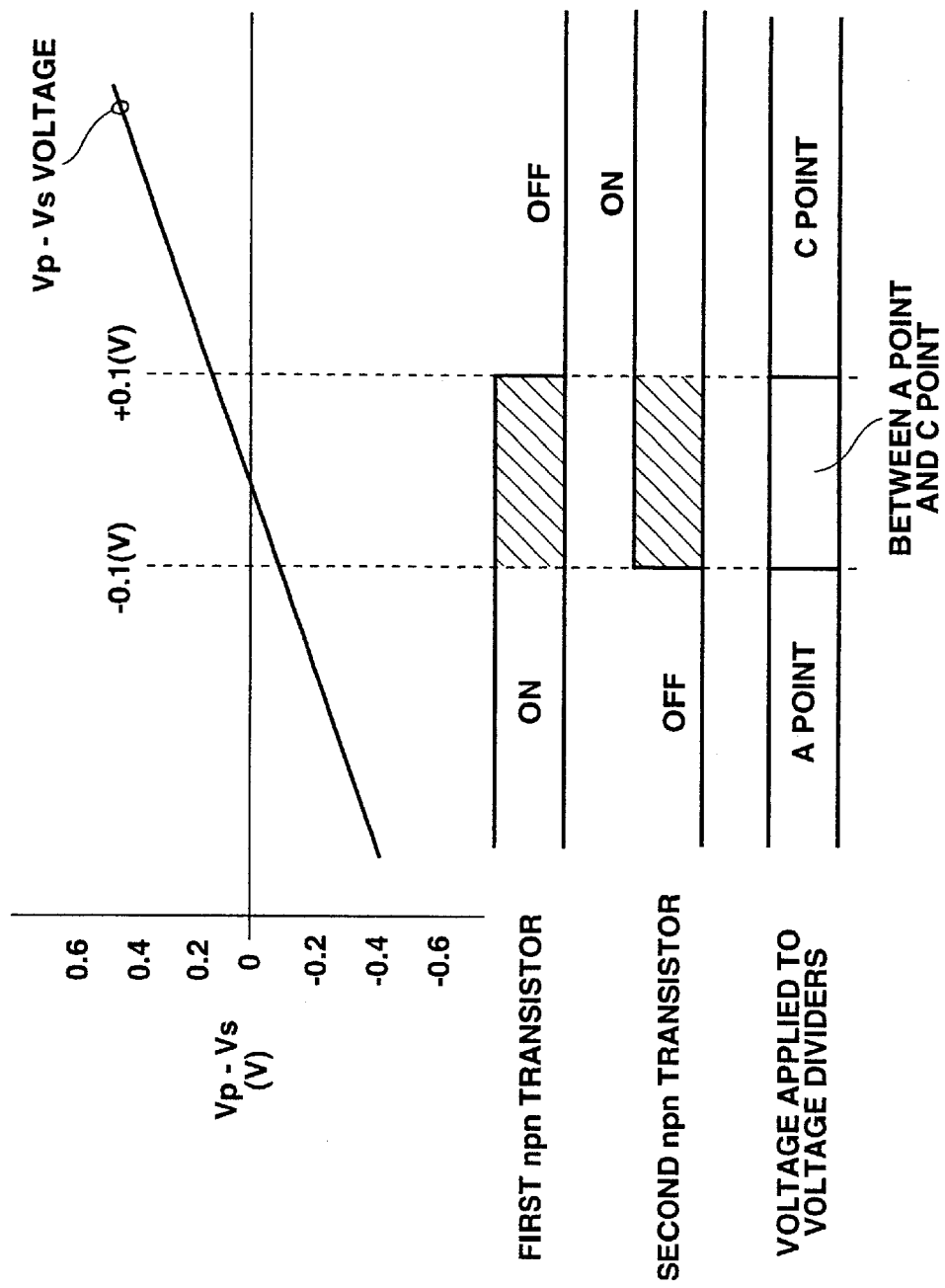
FIG. 7 shows a switching operation of the comparator/detector unit of the first embodiment of the power supply system.

FIG. 7 shows the operations of the first and second switching transistors 35 and 36 and the shifts of the position where a voltage is applied to the series-connected voltage dividers 31 and 32 in case the first and second npn transistors 35 and 36 are turned on at the same time.

When the first and second switching transistors 35 and 36 are turned on at the same time, a voltage at the A point and a voltage at the C point are divided by the resistors 33 and 34, respectively, and the divided voltages are applied to the series-connected voltage dividers 31 and 32, respectively. Thus, when the potential at the A point is equal to or nearly equal to that at the C point, a potential difference between the A and C points will be detected.

Figure 8:
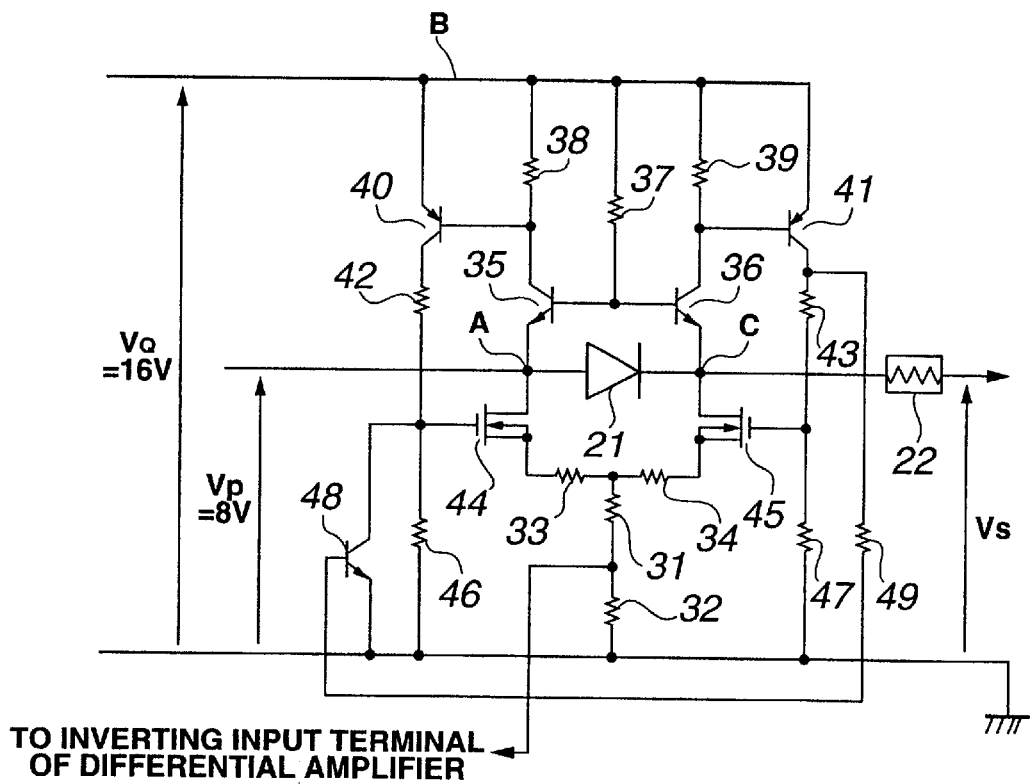
FIG. 8 shows another example of a comparator/detector unit of the first embodiment of the power supply system.

In order to prevent the first and second npn transistors 35 and 36 from being turned on at the same time, there may be provided in the comparison/detection circuit 25, for example, a third npn transistor 48 having a collector connected to the gate of the first FET 44, an emitter connected to the ground and a base connected to the collector of the second pnp transistor 41 via a resistor 49, as shown in FIG. 8.

In the comparison/detection circuit 25 having the third npn transistor 48, when the second pnp transistor 41 is turned on, the third npn transistor 48 is turned on. When the third npn transistor 48 is turned on, the first FET 44 is always turned off, even with the first pnp transistor 40 being on. That is, the third npn transistor 48 prevents the first FET 44 and the second FET 45 from being turned on at the same time to preferentially turn on the second FET 45.

Figure 9:
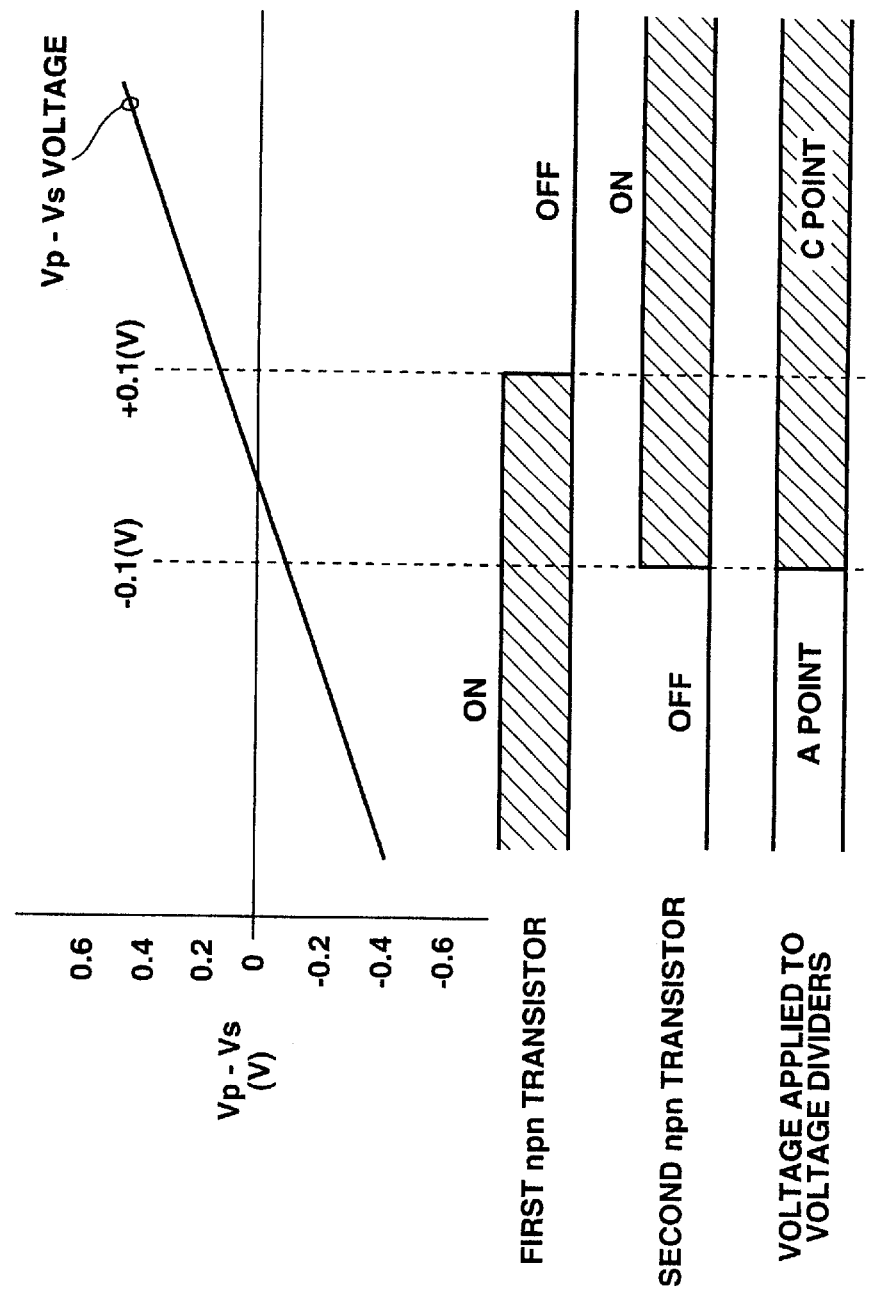
FIG. 9 shows a switching operation of another example of the comparator/detector unit of the first embodiment of the power supply system.

FIG. 9 shows the operations of the first and second npn transistors 35 and 36 and the shifts of the position where a voltage is applied to the series-connected voltage dividers 31 and 32 in case the third npn transistor 48 is provided.

In the case where a third npn transistor 48 is provided, the potential at the C point is applied to the series-connected voltage dividers 31 and 32 during the period for which both the first npn transistor 35 and second npn transistor 36 are on, for example, when the potential difference between the A and C points is within ±0.1 V, as shown in FIG. 9.

The configuration of the comparison/detection circuit 25 is not limited to the one shown in FIG. 5, and any circuit can be employed which would be able to compare the potential at the A point with that at the C point and connect the anode of the reverse flow-preventive diode 21 to the series-connected voltage dividers 31 and 32 when the potential at the A point is lower and while connecting the cathode of the reverse flow-preventive diode 21 to the series-connected voltage dividers 31 and 32 when the potential at the C point is lower.

Figure 10:
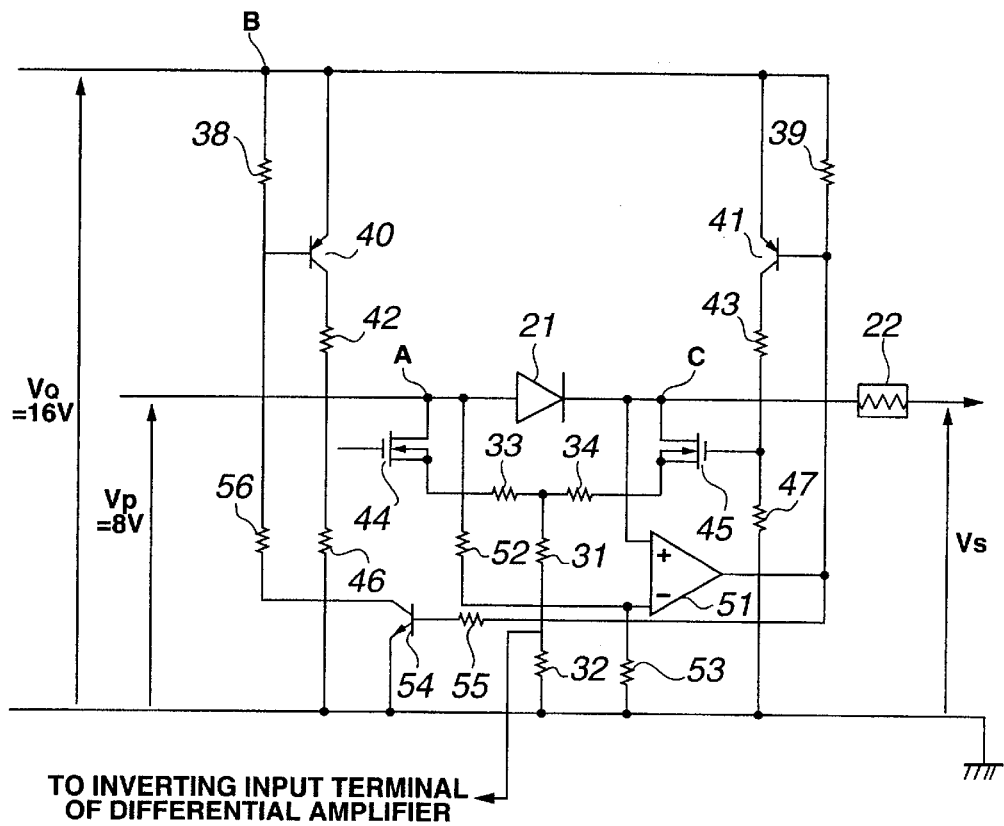
FIG. 10 shows yet another example of a comparator/detector unit of the first embodiment of the power supply system.

A circuit can also be employed which uses a comparator 51, as shown in FIG. 10, and not the first and second npn transistors 35 and 36 having the bases thereof connected to each other.

A comparison/detection circuit will be explained hereinafter with reference to FIG. 10. As shown, the parts or components similar to those of the comparison/detection circuit 25 shown in FIG. 5 are indicated with the same reference numerals.

The voltage dividers 31 and 32 are connected in series, and has one end thereof connected to the ground. More specifically, the voltage divider 32 has one end thereof connected to the ground and the other end connected to the voltage divider 31. The connection point between the voltage dividers 31 and 32 is connected to the inverting input terminal of the differential amplifier 26.

The reverse flow-preventive diode 21 has an anode (A point) connected to the negative input terminal of the comparator 51 via a resistor 52. It has a cathode (C point) connected to the positive input terminal of the comparator 51. The comparator 51 has a negative input terminal connected to the ground via a resistor 53.

The comparator 51 has an output terminal connected to the base of a fourth npn transistor 54 via a resistor 55. The fourth npn transistor 54 has an emitter connected to the ground, and a collector connected to the base of the first pnp transistor 40 via a resistor 56. The comparator 51 has an output terminal connected to the base of the second pnp transistor 41.

The first pnp transistor 40 has the base thereof connected to the B point via the resistor 38. The second pnp transistor 41 has the base thereof connected to the B point via the resistor 39.

The first pnp transistor 40 has the emitter thereof connected to the B point. The second pnp transistor 41 has the emitter thereof connected to the B point. The first pnp transistor 40 has the collector thereof connected to the gate of the first FET 44 via the resistor 42. The second pnp transistor 41 has the collector thereof connected to the gate of the second FET 45 via the resistor 43.

The first FET 44 has a gate connected to the ground via the resistor 46. The second FET 45 has a gate connected to the ground via the resistor 47. The first FET 44 has a source thereof connected via the resistor 33 to the one end of the series-connected voltage dividers 31 and 32 that is not connected to the ground. The second FET 45 has the source thereof connected via the resistor 34 to the one end of the series-connected voltage dividers 31 and 21 that is not connected to the ground.

The first FET 44 has a drain connected to the anode (A point) of the reverse flow-preventive diode 21. The second FET 45 has a drain connected to the cathode (C point) of the reverse flow-preventive diode 21.

Each active element of the comparison/detection circuit 25 becomes operable when a DC voltage applied to the B point is higher than a DC voltage applied to the A point. For example, each active element of the comparison/detection circuit 25 is operable when a voltage of 8 V is applied to the A point and a voltage of 16 V is applied to the B point.

The comparator 51 compares the potential at the A point with that at the C point and provides a High output when the potential at the A point is lower or a Low output when the potential at the C point is lower.

When the comparator 51 provides a Low output, the fourth npn transistor 54 is turned off and the first pnp transistor 40 is also turned off. And, when the comparator 51 provides a Low output, the second pnp transistor 41 is turned on. When the first pnp transistor 40 is turned off, the first FET 44 is turned off. When the second pnp transistor 41 is turned on, the second FET 45 is turned on. Thus, the C point is connected to the series-connected voltage dividers 31 and 32 via the resistor 34.

When the comparator 51 provides a High output, the fourth npn transistor 54 is turned on and the first pnp transistor 40 also is turned on. And, when the comparator 51 provides a High output, the second pnp transistor 41 is turned off. When the first pnp transistor 40 is turned on, the first FET 44 is turned on. When the second pnp transistor 41 is turned off, the second FET 45 also is turned off. Thus, the A point is connected to the series-connected voltage dividers 31 and 32 via the resistor 33.

As in the above, when the potential at the C point is lower than that at the A point, that is, when the cathode potential of the reverse flow-preventive diode 21 is lower than the anode potential of the reverse flow-preventive diode 21 and a forward current flows through the reverse flow-preventive diode 21, the comparison/detection circuit using the comparator 51 applies the cathode potential of the reverse flow-preventive diode 21 to the series-connected voltage dividers 31 and 32. Thus, the cathode potential of the reverse flow-preventive diode 21 is fed back to the PWM circuit 16, so that the cathode potential of the reverse flow-preventive diode 21 will be constant and stable.

And, when the potential at the A point is lower than that at the C point, that is, when the anode potential of the reverse flow-preventive diode 21 is lower than the cathode potential of the reverse flow-preventive diode 21 and a forward current does not flow through the reverse flow-preventive diode 21, the comparison/detection circuit using the comparator 51 applies the anode potential of the reverse flow-preventive diode 21 to the series-connected voltage dividers 31 and 32. Thus, the anode potential of the reverse flow-preventive diode 21 is fed back to the PWM circuit 16, so that the anode potential of the reverse flow-preventive diode 21 will be constant and stable.

Next, the second preferred embodiment of the power supply system according to the present invention will be explained in detail.

Figure 11:
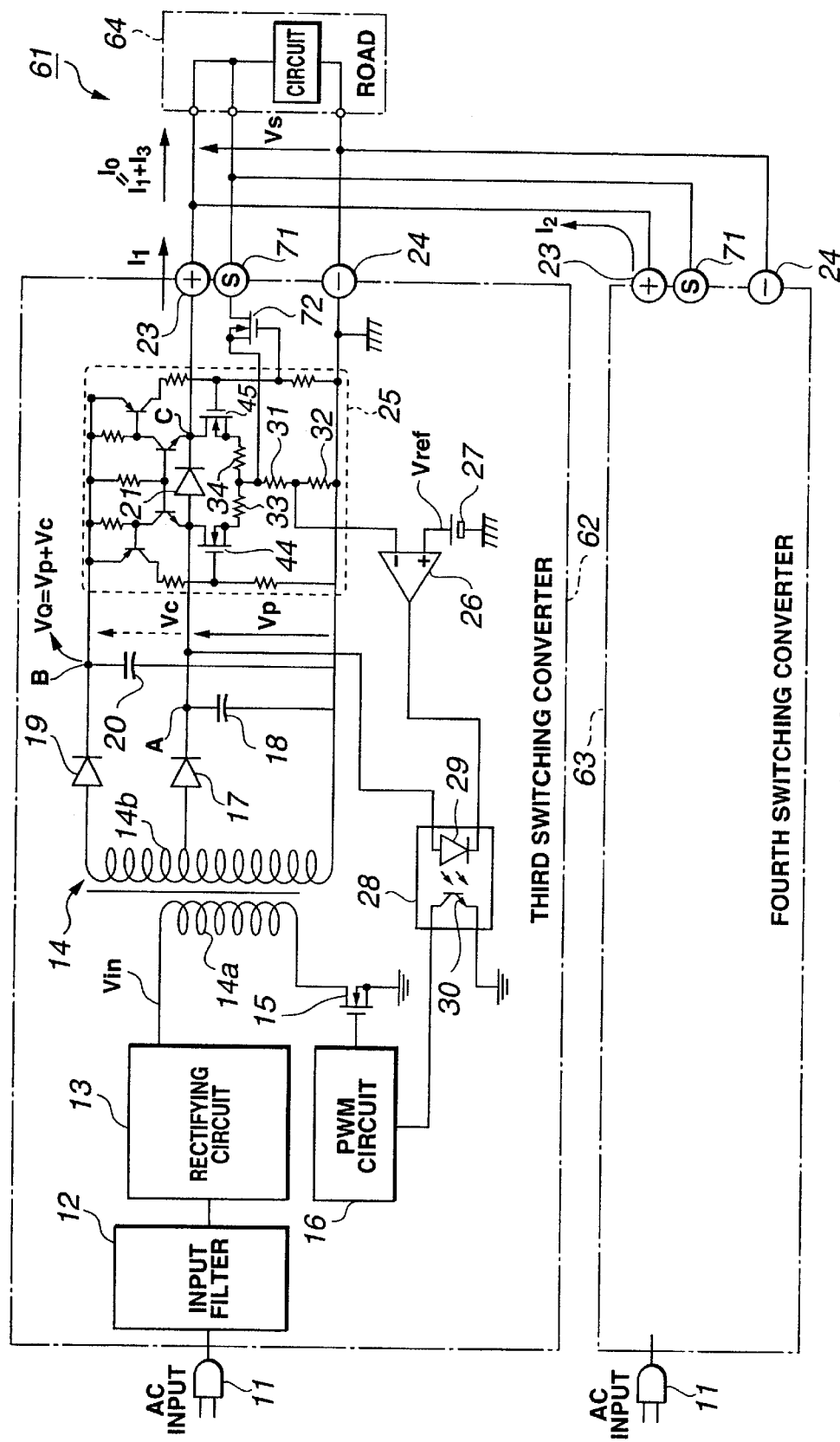
FIG. 11 shows a circuit diagram of the second embodiment of the power supply system employing the present invention.

Referring now to FIG. 11, there is illustrated the second embodiment of the power supply system. The power supply system is indicated generally with a reference 61. It includes two flyback type switching converters connected in parallel to each other, each having a remote sensing terminal. In FIG. 11, the parts or components similar to those of the power supply system 1 according to the first preferred embodiment are indicated with the same reference numerals.

As shown, the power supply system 61 includes third and fourth switching converters 62 and 63 connected in parallel to a load 64. The third and fourth switching converters 62 and 63 are identical in circuit configuration to each other. Therefore, the circuit configuration of only the third switching converter 62 will be explained hereinafter.

The third switching converter 62 includes the AC input terminal 11, the input filter 12, the rectifying circuit 13, the transformer 14 having the primary winding 14a and the secondary winding 14b, the switching element 15, the PWM circuit 16, the first rectifier diode 17, the first smoothing capacitor 18, the second rectifier diode 19 and the second smoothing capacitor 20. The connected state and operations of these components and circuits are the same as those of the power supply system 1 according to the first preferred embodiment.

The third switching converter 62 further includes the reverse flow-preventive diode 21, the positive output terminal 23 and the negative output terminal 24. The reverse flow-preventive diode 21 has the anode thereof connected to the cathode of the first rectifier diode 17 and the cathode thereof connected to the positive output terminal 23, respectively.

The third switching converter 62 further includes the comparison/detection circuit 25, the differential amplifier 26 to detect output voltage error, the reference voltage source 27 to generate a reference voltage ($V_{ref}$) and the photocoupler 28 consisting of the light emitting diode 29 and the phototransistor 30. The connected state and operations of these components and circuits are the same as those of the power supply system 1 according to the first preferred embodiment.

The third switching converter 62 further includes a remote sensing terminal 71, a third FET 72 and a resistor 73.

The remote sensing terminal 71 is a terminal to which there is connected a remote sensing line connected to the circuit of the load 64, and is separate from the power-supplying line connected to the positive output terminal 23. For example, when the power supply system 61 and load 64 are connected to each other by a connecter, etc., there will take place a contact resistance between the power supply system 61 and load 64, which will result in an unstable voltage drop, in the power source line and which depends upon the state of contact between them. With the remote sensing line thus provided, it is possible to feed back the voltage applied to the load 64 from the third switching converter 62 to directly stabilize the voltage applied to the load 64.

The third FET 72 is connected at the drain thereof to the remote sensing terminal 71. The third FET 72 has a gate connected to the gate of the second FET 45. The drain of the third FET 72 is also connected to the one end of the series-connected voltage dividers 31 and 32, that is not connected to the ground.

In the third switching converter 62, the third FET 72 and second FET 45 are switched while they are being interlocked with each other. As a result, a voltage from the remote sensing terminal 71 is preferentially applied to the series-connected voltage dividers 31 and 32, to stabilize the voltage applied to the load 64.

In the power supply system 61 according to the second preferred embodiment of the present invention, the third and fourth switching converters 62 and 63 are connected in parallel to the load 64 and supply the load 64 with a power.

More specifically, the positive output terminal 23 of the third switching converter 62 and the positive output terminal 23 of the fourth switching converter 63 are connected to each other and to the positive power input terminal of the load 64. Furthermore, the negative output terminal 24 of the third switching converter 62 and the negative output terminal 24 of the fourth switching converter 63 are connected to each other and to the negative power input terminal of the load 64.

As in the above, the second embodiment of the power supply system 61 supplies the load 64 with power which is larger than that generated by one switching converter. Furthermore, if any one of the switching converters fails, the power supply system 61 can be backed up by the other normal one.

In the power supply system 61, a reverse flow is prevented from flowing from outside to the third and fourth switching converters 62 and 63, and output voltage is controlled without the influence of a voltage drop by the reverse flow-preventive diode 21. Thus, a stabilized, accurately controlled output voltage can be supplied to the load 64. Furthermore, in the power supply system 61, since an output voltage is controlled without the influence of a voltage dro4p by the reverse flow-preventive diode 21, the difference between the currents supplied from the third and fourth switching converters 62 and 63, respectively, to the load 64 is minimized, thereby improving the product's reliability.

Next, the third preferred embodiment of a power supply system according to the present invention will be explained in detail.

Figure 12:
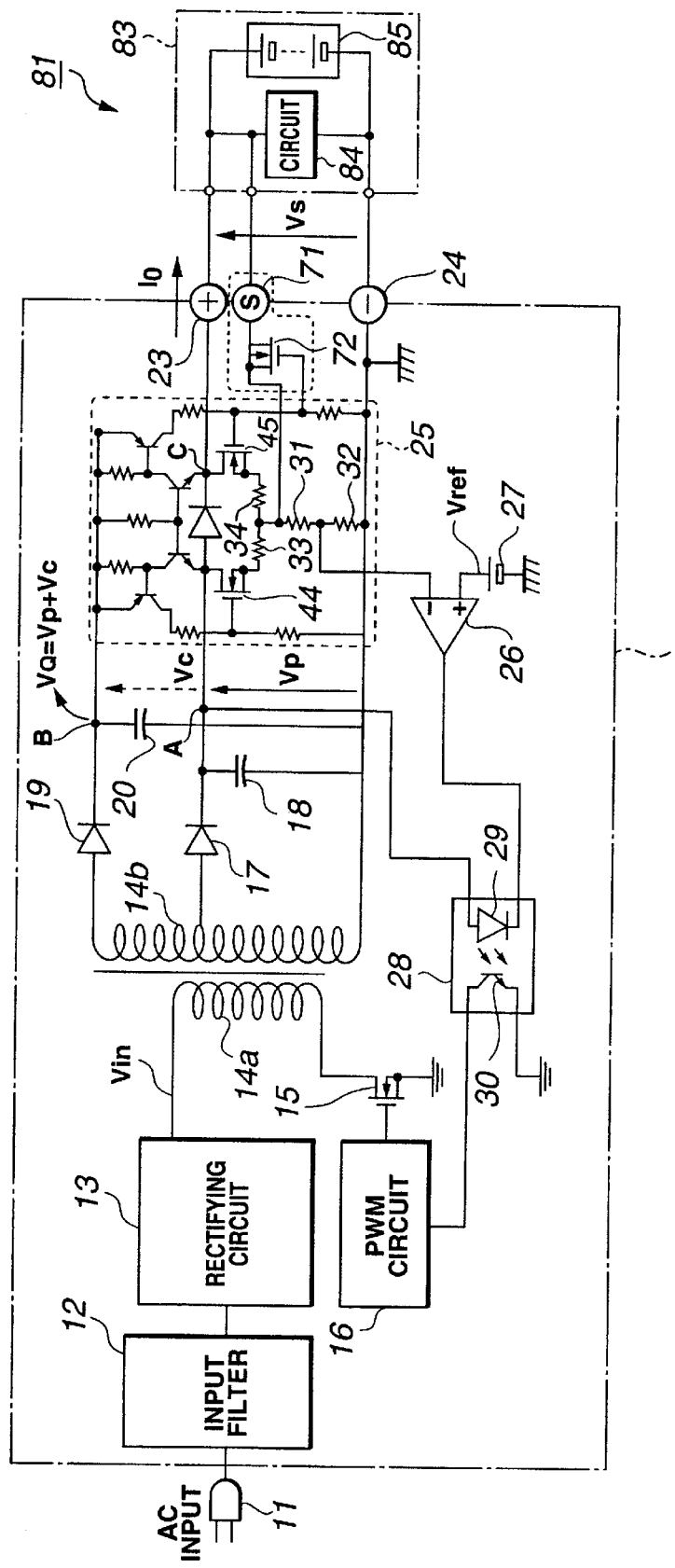
FIG. 12 shows a circuit diagram of the third embodiment of the power supply system employing the present invention.

Referring now to FIG. 12, there is illustrated the third embodiment of the power supply system according to the present invention. The power supply system uses a flyback type switching converter adapted for supplying power to a load incorporating a secondary battery. In FIG. 12, the parts or components similar to those of the first switching converter 2 of the power supply system 1 according to the first preferred embodiment and the third switching converter 62 of the power supply system 61 according to the second preferred embodiment are indicated with the same reference numerals.

The switching converter 82 shown in FIG. 12 supplies power to a load 83, composed of a circuit 84 and a secondary battery 85 for supplying a power to the circuit 84.

The switching converter 82 includes the AC input terminal 11, the input filter 12, the rectifying circuit 13, the transformer 14 having the primary winding 14a and the secondary winding 14b, the switching element 15, the PWM circuit 16, the first rectifier diode 17, the first smoothing capacitor 18, the second rectifier diode 19 and the second smoothing capacitor 20. The connected state and operations of these components and circuits are the same as those of the power supply system 1 according to the first preferred embodiment.

The switching converter 82 further includes the reverse flow-preventive diode 21, the positive output terminal 23 and the negative output terminal 24. The reverse flow-preventive diode 21 has the anode thereof connected to the cathode of the first rectifier diode 17 and the cathode thereof connected to the positive output terminal 23, respectively.

The switching converter 82 further includes the comparison/detection circuit 25, the differential amplifier 26 to detect output voltage error, the reference voltage source 27 to generate a reference voltage ($V_{ref}$) and the photocoupler 28 consisting of the light emitting diode 29 and the phototransistor 30. The connected state and operations of these components and circuits are the same as those of the power supply system 1 according to the first preferred embodiment.

The switching converter 82 further includes the remote sensing terminal 71, the third FET 72 and the resistor 73. The connected state and operations of these components and circuits are the same as those of the power supply system 61 according to the second preferred embodiment.

There is a possibility that a reverse flow is flowing from the secondary battery 85 to the switching converter 82 adapted for supplying the load 83 having the secondary battery 85 with power. In the power supply system 81 according to the third preferred embodiment, a reverse flow is prevented from flowing from the load 83 and output voltage is controlled without the influence of a voltage drop by the reverse flow-preventive diode 21. Thus, a stabilized output voltage controlled accurately can be supplied to the load 83. Furthermore, in the power supply system 81, since an output voltage is controlled without the influence of a voltage drop by the reverse flow-preventive diode 21, the difference between the currents is minimized, and the product's reliability is thereby improved.

In the foregoing, the first, second and third preferred embodiments employing the present invention have been explained using the switching converters as DC voltage sources. However, any other DC voltage source, such as a series regulator or the like, may be used in place of the switching converters.

While the present invention has been described with reference to specific embodiments chosen for the purpose of illustration, it should be apparent that numerous modifications could be made thereto by those skilled in the art without departing from the basic concept and scope of the present invention.

What is claimed is:

1. A power unit comprising:

a DC voltage source;

an output terminal connected to an external load to supply power to the latter;

a diode provided between the DC voltage source and output terminal, whose anode is connected to the DC voltage source and cathode is connected to the output terminal;

means for controlling a DC voltage generated by the DC voltage source based on an output voltage control signal; and means for comparing the anode and cathode potentials of the diode with each other, and supplying the controlling means with the anode potential of the diode as the output voltage control signal when the anode potential is lower, while supplying the controlling means with the cathode potential of the diode as the output voltage control signal when the cathode potential is lower.

2. The power unit as set forth in claim 1, wherein the comparing means comprises a first transistor having the emitter thereof connected to the anode of the diode and a second transistor having the base and emitter thereof connected to the base of the first transistor and the cathode of the diode, respectively, to compare the anode and cathode potentials of the diode with each other.

3. The power unit as set forth in claim 1, wherein the comparing means comprises a comparator circuit having one input terminal thereof connected to the anode of the diode and the other input terminal thereof connected to the cathode of the diode, to compare the anode and cathode potentials of the diode with each other.

4. The power unit as set forth in claim 1, further comprising an output resistor provided between the diode and the output terminal.

5. The power unit as set forth in claim 1, further comprising a sense terminal connected to the external load and that is supplied with a voltage applied to the external load, wherein the comparing means compares the anode and cathode potentials of the diode with each other and supplies the controlling means with the anode potential of the diode as the output voltage control signal when the anode potential is lower, while supplying the controlling means with the potential supplied from the sense terminal as the output voltage control signal when the cathode potential is lower.

6. A power supply system having a plurality of power units connected in parallel to an external load, each of the power units including:

a DC voltage source;

an output terminal connected to the external load to supply power to the latter;

a diode provided between the DC voltage source and output terminal, whose anode is connected to the DC voltage source and cathode is connected to the output terminal;

an output resistor provided between the diode and output terminal;

means for controlling a DC voltage generated by the DC voltage source based on an output voltage control signal; and means for comparing the anode and cathode potentials of the diode with each other and supplying the controlling means with the anode potential of the diode as the output voltage control signal when the anode potential is lower, while supplying the controlling means with the cathode potential of the diode as the output voltage control signal when the cathode potential is lower; and output resistors of the power units having the same resistance.

* * * * *